United States Patent
Dotson et al.

(10) Patent No.: US 6,582,503 B2
(45) Date of Patent: Jun. 24, 2003

(54) POLYOLEFIN ADDITIVE COMPOSITION COMPRISING 3,4-DIMETHYLDIBENZYLIDENE SORBITOL AND 3,4-DICHLORODIBENZYLIDENE SORBITOL

(75) Inventors: Darin L. Dotson, Spartanburg, SC (US); Nathan A. Mehl, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 70 days.

(21) Appl. No.: 09/871,190

(22) Filed: May 31, 2001

(65) Prior Publication Data

US 2002/0188044 A1 Dec. 12, 2002

(51) Int. Cl.⁷ .............................................. C09J 105/00
(52) U.S. Cl. ..................... 106/162.1; 524/108
(58) Field of Search ...................... 524/108; 106/162.1

(56) References Cited

U.S. PATENT DOCUMENTS

| | | | |
|---|---|---|---|
| 3,721,682 A | 3/1973 | Murai et al. | 260/340.7 |
| 4,371,645 A | 2/1983 | Mahaffey, Jr. | 524/108 |
| 4,429,140 A | 1/1984 | Murai et al. | 549/370 |
| 4,562,265 A | 12/1985 | Machell | 549/364 |
| 4,902,807 A | 2/1990 | Kobayashi et al. | 549/364 |
| 5,049,605 A | 9/1991 | Rekers | 524/108 |
| 5,731,474 A | 3/1998 | Scrivens et al. | 568/592 |

FOREIGN PATENT DOCUMENTS

| | | |
|---|---|---|
| JP | 199003 | 8/1996 |
| JP | 325415 | 12/1996 |

*Primary Examiner*—Peter D. Mulcahy
(74) *Attorney, Agent, or Firm*—Terry T. Moyer; William S. Parks

(57) ABSTRACT

A specific combination of two different polyolefin clarifying and nucleating agents, namely bis(3,4-dimethyldibenzylidene) sorbitol (3,4-DMDBS) and bis(3,4-dichlorodibenzylidene) sorbitol (3,4-DCDBS). Such a combination surprisingly provides improved clarification comparable to polypropylene articles and formulations, better than DCDBS alone and equivalent or better than DMDBS alone. Such a combination of compounds thus permits the utilization of a new additive for the purpose of modifying polyolefin properties, such as polypropylene clarification and nucleation. The inventive combination may be introduced within any polyolefin composition, again preferably polypropylene, which may then be molded into any shape or form. A method of producing a polyolefin plastic utilizing the inventive combination of compounds is also provided.

36 Claims, No Drawings

POLYOLEFIN ADDITIVE COMPOSITION COMPRISING 3,4-DIMETHYLDIBENZYLIDENE SORBITOL AND 3,4-DICHLORODIBENZYLIDENE SORBITOL

FIELD OF THE INVENTION

This invention relates to a specific combination of two different polyolefin clarifying and nucleating agents, namely bis(3,4-dimethyldibenzylidene) sorbitol (3,4-DMDBS) and bis(3,4-dichlorodibenzylidene) sorbitol (3,4-DCDBS). Such a combination surprisingly provides improved clarification comparable to polypropylene articles and formulations, better than DCDBS alone and equivalent or better than DMDBS alone. Such a combination of compounds thus permits the utilization of a new additive for the purpose of modifying polyolefin properties, such as polypropylene clarification and nucleation. The inventive combination may be introduced within any polyolefin composition, again preferably polypropylene, which may then be molded into any shape or form. A method of producing a polyolefin plastic utilizing the inventive combination of compounds is also provided.

BACKGROUND OF THE PRIOR ART

Dibenzylidene sorbitol acetals ("DBS"), substituted DBS, such as can be made with alkyl substituted aromatic aldehydes, and related acetals have found utility as nucleating agents, clarifying agents, gelling agents, processing aids, and strength modifiers in polyolefin resins, polyester resins, deodorant, and antiperspirant compositions; hydrocarbon fuels; waste liquids, especially those containing organic impurities; and paint.

Such compounds are utilized to provide nucleation sites for polyolefin crystal growth during cooling of a molten formulation. Without being limited to one specific scientific theory, it is believed that DBS compounds form fibrous networks within the molten polyolefin (such as polypropylene) at a temperature well above that required for polyolefin crystal formation. The fibrous networks appear to act as sites for more ordered and faster polyolefin crystallization during cooling. During the process of crystallization, polymer crystals organize into larger superstructures that are referred to as spherulites. The more uniform, and preferably smaller, the spherulite size, the reduced possibility for light to be scattered. In such a manner, optical opacity of the polyolefin article itself can be controlled. Thus, DBS compounds are very important to the polyolefin industry in order to provide such desired nucleation and clarification properties.

DBS derivative compounds are typically prepared by the condensation reaction of two moles of an aromatic aldehyde with one mole of a polyhydric alcohol, such as xylitol or sorbitol. Examples of suitable processes may be found in Murai et al., U.S. Pat. No. 3,721,682; Murai et al., U.S. Pat. No. 4,429,140; Machell, U.S. Pat. No. 4,562,265; Kobayashi et al., U.S. Pat. No. 4,902,807; and Scrivens et al., U.S. Pat. No. 5,731,474. All of these references are hereby incorporated by reference in their entirety.

Specific clarifying and nucleating agents for polyolefins include bis(3,4-dichlorodibenzylidene) sorbitol (3,4-DCDBS) and bis(3,4-dimethyldibenzylidene) sorbitol (3,4-DMDBS). These specific compounds and polyolefins containing such compounds have been taught previously in U.S. Pat. Nos. 4,371,645 to Mahaffey and 5,049,605 to Rekers, respectively. Such compounds are thus individually known as polyolefin additives and exhibit relatively low haze measurements within polyolefins (as low as about 8% for 3,4-DMDBS and about 9% for DCDBS in random copolymer polypropylene injection molded 50 mil thick plaques having 2000 ppm of clarifier added).

Surprisingly, 3,4-DCDBS does not present a significant organoleptic problem within target plastics. It is well known that p-chlorodibenzylidene sorbitol exhibits troublesome odor and taste problems due to degradation of the compound into its separate benzaldehyde and sorbitol components and migration of the resultant benzaldehyde within and from the target plastic. The p-chloro benzaldehyde itself exhibits highly undesirable organoleptics (foul taste and odor) such that the target polyolefin is limited in its end-use function to non-food contact applications. Such a problem is not exhibited by the dichloro benzaldehyde, particularly when present within the inventive mixture with 3,4-DMDBS. The 3,4-DCDBS appears to suffer from the same type of degradation possibilities as the p-chloro compound; however, again, the resultant benzaldehyde, surprisingly, does not create the same organoleptic problems.

Unfortunately, though, 3,4-DMDBS is relatively expensive to manufacture. As a result, there remains a great desire to develop a more cost-effective, yet acceptable clarifying agent or composition for polyolefins which exhibits similar haze results as 3,4-DMDBS, but mixed with another compound (or compounds) to reduce the amount of expensive 3,4-DMDBS present therein. To date, there has been no teaching or fair suggestion for any such improvements to lower the amount of 3,4-DMDBS in order to reduce the costs of such a composition solely comprising such a polyolefin clarifying agent without sacrificing clarification ability. There does exist a combination of 3,4-DMDBS with bis(p-chlorobenzylidene) sorbitol in Japanese Application Hei 8[1996]-199003 to Kobayashi; however, such a composition provides deleterious results from an organoleptic perspective. Japanese Application Hei 8[1996]-32415, also to Kobayashi, teaches a combination of bis-p-methyldibenzylidene sorbitol with bis-p-chlorodibenzylidene sorbitol as a polyolefin additive as well. Again, organoleptics are problematic with such a composition. Neither teaching shows or fairly suggests the combination of 3,4-DMDBS and 3,4-DCDBS. The only other teachings concerning such polyolefin clarifying compounds have been as individually utilized compounds within polyolefin compositions and articles, as noted above. Thus, there remains a desire to provide a more cost-effective but similarly performing clarifying agent comprising the excellent clarifier 3,4-DMDBS.

OBJECTS OF THE INVENTION

Therefore, an object of the invention is to provide a lower cost alternative to a polyolefin clarifier containing 3,4-DMDBS alone exhibiting excellent clarifying capabilities for the same polyolefin articles and compositions. Another object of the invention is to provide a polyolefin composition or article comprising a combination of 3,4-DMDBS and 3,4-DCDBS exhibiting a haze measurement below that for the same amount of 3,4-DCDBS present as the sole clarifying agent.

Accordingly, this invention encompasses a polyolefin additive composition comprising a combination of both bis(3,4-dimethylbenzylidene) sorbitol and bis(3,4-dichlorobenzylidene) sorbitol. More specifically, this invention encompasses such a combination consisting of from 5 to 95% by weight of the total combination of bis(3,4-dimethylbenzylidene) sorbitol and from 5 to 95% by weight of the total combination of bis(3,4-dichlorobenzylidene) sorbitol. Finished solid articles of polyolefins, such as, preferably, though not necessarily, polypropylene, comprising such an additive composition are also contemplated within this invention. Further contemplated is a polyolefin clarifier composition comprising at least 100 ppm of a combination of nucleator compounds, wherein said compounds are bis(3,4-dimethylbenzylidene) sorbitol and bis(3,4-dichlorobenzylidene) sorbitol, wherein said polyolefin clarifier composition provides a haze measurement within a target polyolefin article formulation below the haze measurement provided for a comparative polyolefin article comprising the same polyolefin formulation but comprising bis(3,4-dichlorobenzylidene) sorbitol as its sole polyolefin clarifier component, wherein such haze measurements are made in accordance with ASTM Standard Test Method D1003-61, and wherein the concentration of said sole polyolefin nucleator component within said comparative polyolefin article is equivalent to the total concentration of the polyolefin nucleator mixture within said target polyolefin article. The importance of and definition of such haze measurements are discussed in greater detail below. Lastly, the invention encompasses a method of nucleating a polyolefin comprising the steps of (a) providing a nucleator composition comprising at least 100 ppm of a combination of bis(3,4-dimethylbenzylidene) sorbitol and bis(3,4-dichlorobenzylidene) sorbitol; (b) providing a polyolefin formulation; (c) mixing said composition of step "a" with the polyolefin of step "b"; (d) melting said resultant mixture of step "c"; and allowing said molten mixture of step "d" to cool. Nowhere within the pertinent prior art is such a combination, polyolefin additive composition, polyolefin articles comprising such combinations and additives compositions, or methods of producing polyolefin articles taught or fairly suggested.

DETAILED DESCRIPTION OF THE INVENTION

The invention thus comprises basically both 3,4-DMDBS and 3,4-DCDBS in specific proportions. The combination of both compounds has been avoided in the past, most likely due to the differences in structure (as well as potential and/or feared organoleptic problems) of the two compounds. Since dimethyl and dichloro types of the DBS exhibit a number of different structural elements, including, without limitation, size of pendant groups (with methyls relatively small as compared with chlorine atoms), and ionic attraction (with chlorine being electron withdrawing, as compared with methyl groups, which are electron donating), to name a few. Because of the need to provide the aforementioned fibrous networks within the target molten plastic for regulated crystal growth, again, the structural differences between these two compound would most likely result in difficulties with optimum network production. It has now been determined, surprisingly, that the structures of these two compounds appear to complement each other in the generation of the necessary fibrous network for polymer crystal growth thereon, such that haze is lowered for such target plastics (such as polypropylene, for example), and that organoleptics are not a significant problem. Thus, such an inventive physical mixture of 3,4-DMDBS and 3,4-DCDBS is a viable polymer nucleation and clarification additive.

Such a result is against commonly accepted practice. For example, as noted above, and without intending to be bound to any specific scientific theory, it appears that the DBS compound within a polyolefin appears to provide a fibrous network of nucleation sites for polyolefin crystal growth during cooling of the molten polymer. The network formed by 3,4-DMDBS alone accords what appears to be standard small spherulite sizes for low haze measurements. The network formed by 3,4-DCDBS produces larger average spherulite sizes, thereby producing high haze measurements. It is noted that all haze measurements noted herein include a standard deviation of +/−0.2 haze units.

Thus, it has been found that a composition of from 5–95% by weight of 3,4-DCDBS and from 5–95% by weight of 3,4-DMDBS, with a total of 100% for both components, provides the highly unexpected benefits as noted above, particularly when incorporated within a target polyolefin, preferably polypropylene. Preferably, such a mixture is from about 10–90% by weight 3,4-DCDBS and from about 10–90% by weight of 3,4-DMDBS; more preferably, about 20–80% by weight of 3,4-DCDBS and from about 20–80% by weight of 3,4-DMDBS; still more preferably, 25–75% 3,4-DCDBS, and 25–75% 3,4-DMDBS, and most preferably about 50% 3,4-DCDBS and about 50% 3,4-DMDBS. Such a combination may be incorporated within an additives package composition including other components, including, base polyolefin, and other compounds and formulations noted below in greater detail. Such an inventive combination, and compositions comprising such an inventive combination, may be present in any type of standard polyolefin additive form, including, without limitation, powder, prill, agglomerate, liquid suspension, and the like. Basically, any form may be exhibited by such a combination or composition including such combination made from blending, agglomeration, compaction, and/or extrusion. The total concentration of the inventive combination of nucleator compounds within the target polyolefin may be anywhere from about 1000 ppm to about 4000 ppm; preferably such a concentration is from about 1000 ppm to about 3500 ppm; more preferably is from about 1200 ppm to about 3000 ppm; still more preferably is from about 1500 ppm to about 3000 ppm; and most preferably from about 1500 ppm to about 2200 ppm.

It may also be desirable to include up to 50% or more of the active combination in a masterbatch, although this is not a restriction. Optional additives within the inventive combination, or within the final thermoplastic article made therewith, may include plasticizers, stabilizers, ultraviolet absorbers, and other similar standard thermoplastic additives. Other additives may also be present within this composition, most notably antioxidants, antimicrobial agents (such as silver-based compounds, preferably ion-exchange compounds such as ALPHASAN® antimicrobials from Milliken & Company), antistatic compounds, perfumes, chlorine scavengers, and the like. These coadditives, along with the nucleating agents, may be present as an admixture in powder, liquid, or in compressed/pelletized form for easy feeding. The use of dispersing aids may be desirable, such as polyolefin (e.g., polyethylene) waxes, stearate esters of glycerin, montan waxes, and mineral oil. Basically, the inventive combination may be present (up to 20% by weight or more) in any type of standard thermoplastic (e.g., polyolefin, most preferably) additive form, including, without limitation, powder, prill, agglomerate, liquid suspension, and the like, particularly comprising the dispersing aids described above. Compositions made from blending, agglomeration, compaction, and/or extrusion may also be desirable.

Other additives may also be present within this composition, most notably antioxidants, perfumes, acid neutralizers, and the like. In particular, it is contemplated that certain organoleptic improvement additives be added for the purpose of permitting increased amounts of 3,4-DCDBS to be incorporated within the inventive combination, compositions thereof, and end-product polyolefin comprising such. The term "organoleptic improvement additive" is intended to encompass such compounds and formulations as antioxidants (to prevent degradation of both the polyolefin and possibly the target 3,4-DCDBS and/or 3,4-DMDBS), acid neutralizers (to prevent the ability of appreciable amounts of residual acids from attacking the DBS compounds), and benzaldehyde scavengers (such as hydrazides, hydrazines, and the like, to prevent the migration of foul tasting and smelling benzaldehydes to the target polyolefin surface). Such compounds and formulations can be added in any amounts in order to provide such organoleptic improvements as needed. However, the amounts should not appreciably affect the haze results for the target polyolefin itself. Thus, lower amounts on the order of from about 20 ppm to about 2,000 ppm of the total polyolefin component are desired.

The term polyolefin or polyolefin resin is intended to encompass any materials comprised of at least one polyolefin compound. Preferred examples include polypropylene, polyethylene, polybutylene, and any blends or copolymers thereof, whether high or low density in composition. The term thermoplastic is well known in the art to mean a polymeric material that will melt upon exposure to sufficient heat but will retain its solidified state, but not prior shape (without use of a mold), upon sufficient cooling. The nucleated polyolefin is intended to be utilized as, for instance and not by limitation, medical devices, such as syringes, intravenous supply containers, and blood collection apparati; pipes and tubes; standard storage containers; food packages; liquid containers, such as for drinks, medicines, shampoos, and the like; apparel cases; microwaveable articles; shelves; cabinet doors; mechanical parts; automobile parts; and any article where the effects of nucleation may be advantageous.

The inventive nucleator and/or clarifier compositions are also defined in terms of their ability to provide improved haze measurements within polyolefin article formulations above such quantifiable properties available through the sole utilization of 3,4-DCDBS as a nucleator and/or clarifier within the same polyolefin article formulation and at the same total concentration as the inventive nucleator combination, as noted above. The term "same polyolefin article formulation" in this context intended to define the same base polyolefin content as used to produce the comparable polyolefin articles with the inventive compositions incorporated therein, including the same manufacturing process parameters (e.g., melting temperatures, molder barrel temperatures, cooling rates and temperatures, and the like). It would be well appreciated by the ordinarily skilled artisan that such a term does not connote the same exact polyolefin article itself. Thus, in comparison with standard polyolefin article formulations of the same base poyolefin content but with 3,4-DCDBS as the sole nucleating/clarifying additive, the inventive compositions provide increased crystallization onset temperatures and peak crystallization temperatures and decreased haze measurements where the concentration of the sole polyolefin nucleator component a comparative polyolefin article is equivalent to the total concentration of the polyolefin nucleator mixture within the inventive target polyolefin article.

PREFERRED EMBODIMENTS OF THE INVENTION

Examples of particularly preferred additive compositions comprising mixtures of 3,4-DMDBS and 3,4-DCDBS as well as polyolefin articles comprising such mixtures are presented below.

Production of Inventive DBS Mixtures

The specific DBS mixtures were comprised of powders of the individual DBS compounds which were then mixed together physically in powder form in the proportions listed below.

TABLE 1

Proportions Of Inventive DBS Mixtures

| Ex. | 3,4-DMDBS (ppm) | 3,4-DCDBS (ppm) |
| --- | --- | --- |
| 1 | 750 | 750 |
| 2 | 1250 | 1250 |
| 3 | 1750 | 1750 |
| 4(Comparative) | 1500 | 0 |
| 5(Comparative) | 2500 | 0 |
| 6(Comparative) | 3500 | 0 |
| 7(Comparative) | 0 | 1500 |
| 8(Comparative) | 0 | 2500 |
| 9(Comparative) | 0 | 3500 |

Production of Clarified Polypropylene With the Inventive DBS Mixtures

One kilogram batches of target polypropylene were produced in accordance with the following table:

POLYPROPYLENE COMPOSITION TABLE

| Component | Amount |
| --- | --- |
| Polypropylene random copolymer flake (3% ethylene) | 1,000 g |
| Irganox ® 1010, Primary Antioxidant (from Ciba) | 500 ppm |
| Irgafos ® 168, Secondary Antioxidant (from Ciba) | 1000 ppm |
| Calcium Stearate, Acid Scavenger | 800 ppm |
| Clarifying compounds or compositions | as noted |

The base resin (random copolymer, hereinafter "RCP") and all additives (including the powdered inventive mixtures from TABLE 1, above) were weighed and then blended in a Welex high-intensity mixer for 1 minute at about 1600 rpm. All samples were then melt compounded on a Killion single screw extruder at a ramped temperature from about 204° to 232° C. through four heating zones. The melt temperature upon exit of the extruder die was about 246° C. The screw had a diameter of 2.54 cm and a length/diameter ratio of 24:1. Upon melting the molten polymer was filtered through a 60 mesh (250 micron) screen. Plaques of the target polypropylene were then made on an Arburg 25 ton injection molder. The molder barrel was set at a temperature of 220° C. The plaques had dimensions of about 51 mm×76 mm×1.27 mm made from a mirror-polished mold (SPI 1)(for 50 mil thicknesses). The mold cooling circulating water was controlled at a temperature of 25° C. After allowing the plaques to age for 24 hours at room temperature, haze values were measured according to ASTM Standard Test Method D1003-61 "Standard Test Method for Haze and Luminous Transmittance of Transparent Plastics" using a BYK Gardner Hazegard Plus.

The following Table lists the haze values for the plaques prepared with the mixtures of TABLE 1:

TABLE 2

Haze Values for Inventive Plaques

| Plaque | Plaque Thickness | Clarifier (TABLE 1) | Haze Value |
|---|---|---|---|
| A | 50 | 1 | 10.8 |
| B | 50 | 2 | 7.1 |
| C | 50 | 3 | 6.5 |
| D | 50 | 4 | 11.5 |
| E | 50 | 5 | 7.7 |
| F | 50 | 6 | 7.1 |
| G | 50 | 7 | 22.6 |
| H | 50 | 8 | 9.1 |
| I | 50 | 9 | 7.6 |

The plaques produced with the inventive DBS mixtures, rather than the individual DBS compounds themselves, thus exhibited improved haze measurements, all at a lower cost due to the added amount of less expensive 3,4-DCDBS within the final article.

Furthermore, plaques A, B, and C did not exhibit any appreciable aldehyde odors, thereby providing organoleptically acceptable articles.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A polyolefin additive composition comprising a combination of both bis(3,4-dimethylbenzylidene) sorbitol and bis(3,4-dichlorobenzylidene) sorbitol.

2. The polyolefin additive composition of claim 1 wherein said combination consists of from 5 to 95% by weight of the total combination of bis(3,4-dimethylbenzylidene) sorbitol and from 5 to 95% by weight of the total combination of bis(3,4-dichlorobenzylidene) sorbitol.

3. The polyolefin additive composition of claim 2 wherein said combination consists of from 10 to 90% of bis(3,4-dimethylbenzylidene) sorbitol and from 10 to 90% of bis(3,4-dichlorobenzylidene) sorbitol by weight of the total combination.

4. The polyolefin additive composition of claim 3 wherein said combination comprises of from 25 to 50% of bis(3,4-dimethylbenzylidene) sorbitol and from 25 to 50% of bis(3,4-dichlorobenzylidene) sorbitol by weight of the total combination.

5. The polyolefin additive composition of claim 2 wherein said combination comprises of from 40 to 60% of bis(3,4-dimethylbenzylidene) sorbitol and from 40 to 60% of bis(3,4-dichlorobenzylidene) sorbitol by weight of the total combination.

6. The polyolefin additive composition of claim 2 wherein said combination comprises of 50% of bis(3,4-dimethylbenzylidene) sorbitol and 50% of bis(p-methylbenzylidene) sorbitol by weight of the total combination.

7. The polyolefin additive composition of claim 1 further comprising at least one organoleptic improvement additive.

8. The polyolefin additive composition of claim 2 further comprising at least one organoleptic improvement additive.

9. The polyolefin additive composition of claim 3 further comprising at least one organoleptic improvement additive.

10. The polyolefin additive composition of claim 4 further comprising at least one organoleptic improvement additive.

11. The polyolefin additive composition of claim 5 further comprising at least one organoleptic improvement additive.

12. The polyolefin additive composition of claim 6 further comprising at least one organoleptic improvement additive.

13. A solid polyolefin article comprising the additive composition of claim 1.

14. A solid polyolefin article comprising the additive composition of claim 2.

15. A solid polyolefin article comprising the additive composition of claim 3.

16. A solid polyolefin article comprising the additive composition of claim 4.

17. A solid polyolefin article comprising the additive composition of claim 5.

18. A solid polyolefin article comprising the additive composition of claim 6.

19. A solid polyolefin article comprising the additive composition of claim 7.

20. A solid polyolefin article comprising the additive composition of claim 8.

21. A solid polyolefin article comprising the additive composition of claim 9.

22. A solid polyolefin article comprising the additive composition of claim 10.

23. A solid polyolefin article comprising the additive composition of claim 11.

24. A solid polyolefin article comprising the additive composition of claim 12.

25. The solid polyolefin article of claim 13 wherein said polyolefin comprises at least polypropylene.

26. The solid polyolefin article of claim 25 wherein said polypropylene is a random copolymer of polypropylene.

27. The solid polyolefin article of claim 26 wherein said random copolymer exhibits at least some ethylene content.

28. The solid polyolefin article of claim 19 wherein said polyolefin comprises at least polypropylene.

29. The solid polyolefin article of claim 28 wherein said polypropylene is a random copolymer of polypropylene.

30. The solid polyolefin article of claim 29 wherein said random copolymer exhibits at least some ethylene content.

31. A polymer additive composition comprising 1,3:2,4-bis(3,4-dimethylbenzylidene) sorbitol and 1,3:2,4-bis(3,4-dichlorobenzylidene) sorbitol, wherein said additive composition is present in a form selected from the group consisting of a powder, a pellet, and a liquid, and wherein said composition also optionally comprises at least one thermoplastic polymer and at least one compound selected from the group consisting of plasticizers, acid scavengers, antioxidants, antimicrobials, flame retardants, light stabilizers, antistatic agents, blowing agents, colored pigments, and any combination thereof.

32. The polymer additive composition of claim 31 wherein said thermoplastic polymer is present.

33. The polymer additive composition of claim 31 wherein at least one acid scavenger is present.

34. The polymer additive composition of claim 32 wherein at least one acid scavenger is present.

35. The polymer additive composition of claim 31 wherein said 1,3:2,4-bis(dimethylbenzylidene) sorbitol is present in an amount of from about 10 to 90% by weight of the entire composition and wherein said 1,3:2,4-bis(dichlorobenzylidene) sorbitol is present in an amount of from about 10 to about 90% by weight of the entire composition.

36. A method of nucleating a polyolefin comprising the steps of:
(a) providing a nucleator composition comprising at least 1000 ppm of a combination of bis(3,4-dimethylbenzylidene) sorbitol and bis(3,4-dichlorobenzylidene) sorbitol;
(a) providing a polyolefin formulation;
(b) mixing said composition of step "a" with the polyolefin of step "b";
(c) melting said resultant mixture of step "c"; and
(d) allowing said molten mixture of step "d" to cool.

* * * * *